US005124295A

United States Patent [19]
Nebesh et al.

[11] Patent Number: 5,124,295
[45] Date of Patent: Jun. 23, 1992

[54] COPPER CHROMITE CATALYST AND PROCESS FOR PREPARATION SAID CATALYST

[75] Inventors: Eugene Nebesh; Donald G. Kelly, both of Parma; Lawrence T. Novak, South Euclid, all of Ohio

[73] Assignee: Engelhard Corporation, Iselin, N.J.

[21] Appl. No.: 627,013

[22] Filed: Dec. 13, 1990

[51] Int. Cl.$^5$ .................. B01J 21/12; B01J 23/26; B01J 23/72

[52] U.S. Cl. ..................... 502/64; 502/244; 502/318

[58] Field of Search ............ 502/64, 244, 318

[56] References Cited

U.S. PATENT DOCUMENTS

| | | | |
|---|---|---|---|
| 2,741,618 | 4/1956 | Young | 260/290 |
| 2,795,600 | 6/1957 | Chitwood et al. | 260/465.1 |
| 3,020,291 | 2/1962 | Dunlop et al. | 502/318 X |
| 3,630,670 | 12/1971 | Bell et al. | 23/143 |
| 3,642,894 | 2/1972 | Habermann et al. | 502/318 X |
| 3,781,406 | 12/1973 | Roth et al. | 423/213.2 |
| 3,787,322 | 1/1971 | Koberstein et al. | 252/465 |
| 3,855,388 | 12/1974 | Rosinski | 423/213.2 |
| 3,883,445 | 5/1975 | Roth et al. | 252/462 |
| 3,925,490 | 12/1975 | Reich et al. | 260/643 B |
| 3,928,236 | 12/1975 | Rigge et al. | 252/463 |
| 4,124,537 | 11/1978 | Gembicki et al. | 252/465 |
| 4,666,879 | 5/1987 | Kelly et al. | 502/244 |

FOREIGN PATENT DOCUMENTS

| | | |
|---|---|---|
| 80922 | 5/1976 | Poland . |
| 598633 | 3/1978 | U.S.S.R. . |

OTHER PUBLICATIONS

"Furfuryl Hydrogenation Over a Copper-Chromium Alumina Catalyst", Kuzina et al.

Primary Examiner—W. J. Shine
Attorney, Agent, or Firm—Renner, Otto, Boisselle & Sklar

[57] ABSTRACT

In one embodiment, the invention relates to a formed copper chromite catalyst prepared from a blend comprising from about 20 to about 80% by weight of copper chromite and from about 20 to about 80% by weight of at least one extrudable inorganic binder material wherein the catalyst has a surface area of from about 20 to about 225 m$^2$/g, and the total pore volume of the pores in said catalyst having a diameter of up to about 95,000 Å is between about 0.35 to about 1 cc/g. In another embodiment, the invention relates to a process for preparing the formed copper chromite catalyst of the invention, and the process comprises (A) preparing a blend comprising from about 20 to about 80% by weight of copper chromite, from about 20 to about 80% by weight of at least one extrudable inorganic binder material, from about 1 to about 10% by weight, based on the weight of the binder, of a peptizing agent, and sufficient water to form an extrudable blend;
(B) extruding the blend to form an extrudate; and
(C) calcining the extrudate.

The invention also relates to a process for hydrogenating aldehydes, ketones, carboxylic acids and carboxylic acid esters with catalysts of the type described.

22 Claims, No Drawings

COPPER CHROMITE CATALYST AND PROCESS FOR PREPARATION SAID CATALYST

TECHNICAL FIELD

This invention relates to catalysts which are particularly useful as hydrogenation catalysts, and more particularly, catalysts which are useful for hydrogenating aldehydes, olefins, ketones, carboxylic acids and carboxylic esters. The invention also relates to a method of preparing said catalysts and to the use of the catalysts in hydrogenation reactions.

BACKGROUND OF THE INVENTION

In one embodiment, the present invention relates to catalysts which are useful in hydrogenation reactions and which comprise the oxides of copper and chromium, and at least one extrudable inorganic binder material.

Copper chromite catalysts have been used for many years to hydrogenate carbonyl compounds and functional side rings of aromatic compounds. For example, aldehydes can be hydrogenated to the corresponding alcohols, and fatty acids or methyl esters of fatty acids can be converted to saturated fatty alcohols.

Various types of catalysts and catalyst mixtures containing copper, chromium and alumina have been described in the literature. Generally, the copper and chromium are deposited on alumina supports. U.S. Pat. No. 2,741,618 describes a catalyst for use in the production of pyridine from pyrans comprising 93-99% activated alumina, 0.5-5% copper, 0.2-2.0% chromium and less than 0.1% of an alkali metal sulfate. U.S. Pat. No. 2,795,600 describes a chromium promoted copper and activated alumina catalyst containing less than 10% of calcium, barium, lithium or strontium. The catalyst is reported to be useful for the production of nitriles by the vapor phase reaction of primary alcohols and ammonia.

U.S. Pat. Nos. 3,781,406 and 3,883,445 describe an auto exhaust catalyst containing 2 to 15 parts by weight of copper, 0.1 to 10 parts by weight of chromium and 1 to 15 parts of a rare earth metal on 100 parts of alumina support. The alumina is a transition alumina, preferably gamma alumina and is in the form of an extrudate or the like.

U.S. Pat. No. 3,787,322 describes a catalyst for oxidation reactions at high temperatures which comprises a mixture of aluminum oxide of the gamma series with oxides of copper and chromium, the aluminum oxide being present in from about 20 to 45% of the total weight of aluminum oxide and the oxides of copper and chromium. The mole ratio of copper oxide to chromium oxide expressed as $CuO \cdot Cr_2O_3$ is from about 1.2:1 to 2.2:1. The catalyst may contain barium and may be prepared using a mineral acid such as nitric acid, or an organic carboxylic acid as an extrusion aid.

U.S. Pat. No. 3,855,388 describes a method of preparing an extruded copper chromite-alumina oxidation catalyst, and the catalyst is described as being useful for treating exhaust gases from internal combustion engines. Stearic acid is described as an extrusion aid, and acetic acid is described as a peptizing agent in Example 1.

U.S. Pat. No. 4,666,879 describes an extruded copper chromite-alumina hydrogenation catalyst which is prepared by blending copper chromite and an extrudable alumina typically having a pseudoboehmite or an alpha-hydroxy boehmite structure. The extruded and calcined catalyst is useful for the liquid and vapor phase hydrogenation and hydrogenolysis of various carbonyl compounds and the functional side groups of aromatic compounds. The extruded catalyst is characterized in this patent as having a surface area of between 20 and 225 square meters per gram and a packed apparent bulk density of between about 0.70 and about 1.20 g/cc. Small amounts of other materials may be included in the catalyst. For example, the catalyst can contain up to 10% by weight of a stabilizer selected from the group consisting of barium and manganese. Furthermore, small amounts of silica (for up to 15%) can be added to the catalyst along with the alumina, either to replace a portion of the alumina or as a supplement thereto.

SUMMARY OF THE INVENTION

In one embodiment, the invention relates to a formed copper chromite catalyst prepared from a blend comprising from about 20 to about 80% by weight of copper chromite and from about 20 to about 80% by weight of at least one extrudable inorganic binder material wherein the catalyst has a surface area of from about 20 to about 225 m$^2$/g, and the total pore volume of the pores in said catalyst having a diameter of up to about 95,000 Å is between about 0.35 to about 1 cc/g. In another embodiment, the invention relates to a process for preparing the formed copper chromite catalyst of the invention, and the process comprises (A) preparing a blend comprising from about 20 to about 80% by weight of copper chromite, from about 20 to about 80% by weight of at least one extrudable inorganic binder material, from about 1 to about 10% by weight, based on the weight of the binder, of a peptizing agent, and sufficient water to form an extrudable blend;

(B) extruding the blend to form an extrudate; and (C) calcining the extrudate.

The invention also relates to a process for hydrogenating aldehydes, ketones, carboxylic acids and carboxylic acid esters with catalysts of the type described.

DESCRIPTION OF THE PREFERRED EMBODIMENTS

In one embodiment, the present invention relates to a formed copper chromite catalyst prepared from a blend comprising from about 20 to about 80% by weight of copper chromite, and from about 20 to about 80% by weight of at least one extrudable inorganic binder material wherein the catalyst has a surface area of from about 20 to about 225 m$^2$/g, and the total pore volume of the pores in said catalyst having a diameter of up to about 95,000 Å is between about 0.35 to about 1 cc/g. In other embodiments, the surface area of the catalyst is from about 75 to 180 m$^2$/g, and in other embodiments, the total pore volume of the pores in the catalyst having a diameter of up to about 95,000 Å is between about 0.4 to about 0.7 cc/g or between about 0.4 to about 0.6 cc/g.

All references to pore diameters and pore volumes in the specification and claims of this application are based upon measurements utilizing mercury porosimetry. A typical method is described by R. Anderson, *Experimental Methods in Catalytic Research*, Academic Press, New York, 1968. The pore volumes are determined utilizing the catalysts in their oxide forms. That is, the pore diameters and pore volumes reported herein are obtained for the catalyst after calcination, but prior to any reduction of the oxide. Those skilled in the art often refer to the catalyst containing the metal oxides as the "oxide" or "oxide precursor" form of the catalyst.

The catalyst of the present invention contains from about 20 to about 80% by weight of copper chromite. In other embodiments, the catalyst may contain from about 50% to about 80% or 60% to about 80% by weight of copper chromite. At least a portion of the copper chromite present in the catalyst typically exists in a spinel structure and is represented by the formula $CuO \cdot CuCr_2O_4$. The copper chromite typically includes combinations wherein the ratio of melts typically may vary from 1.2 to 4.67 parts by weight of copper to 1 part of chromium.

In addition to the copper chromite, the catalyst of the present invention contains from about 20 to about 80% by weight of at least one extrudable inorganic binder material. Any of the binder materials which have been typically utilized in the preparation of catalysts, including support materials, may be utilized in the present invention provided that the inorganic material is extrudable under the conditions described herein. Thus, the inorganic binder material may be alumina, silica, zinc oxide, zirconium oxide, clay such as Bentonite, zeolites or molecular sieves, silicates such as calcium silicate, etc., and mixtures thereof. In one preferred embodiment, mixtures of inorganic oxides are utilized such as mixtures of alumina and at least one other inorganic oxide. Examples of useful mixtures include: alumina and Bentonite clay, alumina and zinc oxide, alumina and silica, alumina and zirconia, alumina and calcium silicate (Microcel E), alumina and crystalline/aluminosilicate (zeolites or molecular sieves), etc. In one embodiment, the mixtures of alumina and other inorganic oxides such as those described are incorporated into the catalysts of the present invention to provide from about 5 to about 50% by weight of the alumina and from about 0.1 to about 30% by weight of the other inorganic oxide or oxides based on the total weight of the catalyst. In another embodiment, the catalyst of the invention contains from about 5% to about 30% of the other inorganic oxide or oxides based on the total weight of the catalyst.

In one embodiment, the preferred crystalline inorganic polymers which are utilized in combination with alumina are commercially available aluminosilicate zeolite catalysts. Most zeolithic catalysts are complex composites of two or more components, and these zeolites are often classified according to their silica-to-alumina ratios. Generally, the thermal stability of the zeolite increases as the silica-to-alumina ratio increases. In one embodiment, the zeolites useful in the present invention are alumina silicates having a silica-to-alumina mole ratio greater than 10 up to about 200. These are typically classified as high silica materials. The preparation and use of crystalline aluminosilicate type zeolites as catalysts in a wide variety of hydrocarbon conversion processes have been described in a number of patents including U.S. Pat. Nos. 3,140,249; 3,140,251; 3,271,418; and 3,758,403. These patents are hereby incorporated by reference for their disclosures of different types of aluminosilicate zeolites and the preparation of such zeolites which may be used in the present invention.

One preferred zeolite useful in the preparation of the catalysts of the present invention is a medium pore zeolite identified as ZSM-5 type which has a silica/alumina mole ratio in the range of from 10 to about 60. The preparation and characteristics of ZSM-5-type zeolites are described in U.S. Pat. No. 3,758,403. Another similar type of zeolite described in the '403 patent is the ZSM-8 type zeolite which may have a silica to alumina mole ratio in the range of 10 to about 200.

If it is desired to chemically stabilize the catalyst to prevent unnecessary reduction of the copper, a minor amount such as up to about 10% of a stabilizing agent such as barium or manganese is included in the catalyst. The stabilizing compounds may be introduced into the mixture used to prepare the catalyst in the form of the nitrate or some other soluble or insoluble form. Generally, when it is desired to stabilize the catalyst composition, between about 2% and 6% of the stabilizing agent is incorporated into the catalyst.

Since in one embodiment, it is desired to prepare the formed copper chromite catalyst by extrusion, it is preferred that the inorganic binder material utilized in the catalyst is an extrudable material. Accordingly, where the inorganic binder material contains at least some alumina, it is preferred that the alumina utilized will facilitate extrusion of the catalyst mix while at the same time synergistically maintaining or improving the hydrogenation activity of the catalyst. Most aluminas containing at least 10% chemically combined water will be found to be useful. For the purpose of the present invention, pseudoboehmite alumina and alpha-hydroxy alumina have been found to be particularly suitable. Pseudoboehmite alumina refers to an alumina, regardless of the manner of preparation, which when dried at 140°–160° C. for a period of one hour has a loss on ignition (LOI) at 1000° C. for one hour of from about 20% to about 50% by weight, and which exhibits an X-ray diffraction peak in the 6.5–6.8 Å range. Any alumina containing at least 25% of that structure is considered to be pseudoboehmite. One method of preparing alumina with this structure is taught in U.S. Pat. No. 3,630,670. Various pseudoboehmite aluminas are commercially available such as certain members of the Versal family of aluminas sold by LaRoche Chemicals, Inc. and boehmite aluminas such as Catapal aluminas sold by Vista Chemical Company.

Pseudoboehmite aluminas are readily dispersible in an acid medium as colloidal size particles. The acid dispersibility and colloidal size contribute to the ease of extrusion. These aluminas, when calcined at about 500° C., generally have a surface area in the range of about 250 to about 300 $m^2/g$.

The present invention also includes the method of preparing the copper chromite catalyst. The process comprises (A) preparing a blend comprising from about 20 to about 80% by weight of copper chromite, from about 20 to about 80% by weight of at least one extrudable inorganic binder material, from about 1 to about 10% by weight, preferably from about 3 to about 7% by weight, based on the weight of the binder, of a peptizing agent, and sufficient water to form an extrudable blend;

(B) extruding the blend to form an extrudate; and (C) calcining the extrudate.

The extrudate may be dried prior to calcination if desired.

The copper chromite which is utilized in forming the extrudable blends of the present invention may be commercially available, unsupported copper chromite catalyst. In a preferred embodiment of the present invention, a commercially available copper chromite catalyst sold by Engelhard as Cu-1180 P is used in preparing the catalyst of the present invention. This commercial catalyst is a powdered barium-stabilized catalyst useful in slurry phase hydrogenation. A typical composition of the catalyst is 43% CuO, 45% $Cr_2O_3$ and 9% BaO. Another commercially available copper chromite catalyst from Engelhard is designated Cu-1160 P, and a typical composition of this catalyst is 43% CuO, 45% $Cr_2O_3$ and 9% BaO.

Any of the known peptizing agents may be utilized when forming the extrudable blend. Examples of peptizing agents include mineral acids such as nitric acid, hydrochloric acid or sulfuric acid, organic acids such as formic acid or acetic acid, and bases such as ammonium hydroxide.

The above blends of copper chromite and inorganic binder materials may be formed by extruding the blends in known extrusion equipment, and the blends may be extruded into any number of shapes and sizes. For example, the blends can be extruded into a trilobe such as that described in U.S. Pat. No. 4,517,077; a cylindrical shape with a hollow interior and one or more reinforcing ribs such as described in U.S. Pat. Nos. 4,510,263 and 4,089,941; rectangular and triangular shaped tubes such as those described in U.S. Pat. No. 4,441,990; cloverleafs, cross, and C-shapes such as those described in U.S. Pat. No. 3,764,565, etc.

The extrudates which are obtained from any of the above extrusion methods may be dried at temperatures up to 200° C. and thereafter calcined at temperatures of 350° C. or higher. Generally, calcination temperatures of from about 375° to about 475° or 500° C. are utilized. Some of the properties of the catalysts of the present invention are affected by the calcination temperature and calcination atmosphere. For example, higher surface areas generally are obtained at lower calcination temperature and by shorter exposure of the extrudate to higher temperatures.

Following calcination, but before use, the catalyst may be and is normally activated by reducing at least some of the copper chromite and the copper oxide present in the catalyst. The reduction step may be carried out in situ immediately prior to use, or, alternatively, reduction may be carried out in advance of use by contacting the catalyst with hydrogen or a mixture of hydrogen and nitrogen at elevated temperatures according to well-known procedures in which a portion or all of the copper oxide and copper chromite are reduced. The reduced catalyst may then be stabilized or passivated, e.g., by exposing the catalyst to air or $CO_2$ to form a thin oxide layer on the surface, or the reduced catalyst may be stored in a protective medium such as an inert liquid until use.

The surface area of the catalyst of the present invention can be increased by lowering the temperature at which the extrudate is calcined or by reducing the time of calcination at higher temperatures. Surface area of the catalyst can also be increased by using higher surface area binder materials, appropriate extrusion aids and/or peptizing agents.

The total pore volume of the pores in the catalyst of the present invention may be increased by increasing the water content of the extrudable blend so long as the blend remains extrudable and the extrudate maintains its physical integrity. The total pore volume also can be controlled and increased by using lower density binders, and extruders such as the twin screw extruder with appropriate die and extrusion pressure. Extrusion aids such as organic materials may be included in the extrudable blends. Since these organics burn out on calcination of the extrudate, the resulting catalyst will have a higher total pore volume.

The following examples illustrate the catalyst of the present invention and the methods for preparing the catalysts. Unless otherwise indicated in the examples and elsewhere in the specification and claims, all parts and percentages are by weight, temperatures are in degrees Centigrade, and pressures are at or near atmospheric. Extrusion is carried out in a one-inch, single screw extruder, and the extrudates are dried in a forced air tray dryer. The extrudates are calcined in an electrically heated muffle furnace.

EXAMPLE 1

Into a Littleford mixer there are charged 364 grams of Cu-1160 P copper chromite powder, 196 grams of AZO ZnO and 330 grams of Versal-250 alumina (Laroche Chemicals, Inc.). The mixture is dry blended for 5 minutes, and while continuing the mixing, 17 grams of 70% nitric acid diluted with 412 grams of water are added followed by an additional 21 grams of water. Mixing is continued for 50 minutes whereupon 3.3 grams of 29% ammonia solution diluted with 32 grams of water are added. After an additional 5 minutes of mixing, the blend is extruded as ⅛-inch pellets, dried overnight at 150° C. and calcined for one hour at 415° C.

EXAMPLE 2

Into a Littleford mixer there are charged 560 grams of Cu-1160 P copper chromite powder, 87 grams of ZSM-5 zeolite (from Conteka B. V.) and 220 grams of Versal-250 alumina. After dry blending the above for two minutes, 11.5 grams of 70% nitric acid diluted with 442 grams of water are added, and this mixture is mixed for about 38 minutes. To this mixture there are then added 2 grams of 29% ammonia solution diluted with 25 grams of water, and after mixing for 5 minutes, the blend is extruded as ⅛-inch pellets. The pellets are dried overnight at 125° C. and thereafter calcined at 401° C.

EXAMPLE 3

This example is similar to Example 2 except that about 9% less water is used. To a Littleford mixer there are charged 560 grams of Cu-1160 P copper chromite powder, 87 grams of ZSM-5 zeolite and 220 grams of Versal-250 alumina. The mixture is dry blended for 5 minutes. To this mixture there are added 11.5 grams of 70% nitric acid diluted with 394 grams of water, and the contents of the mixer are mixed for 55 minutes. Water (10 grams) is then added and the mixing is continued for 12 minutes whereupon 2 grams of 29% ammonia solution diluted with 20 grams of water are added. After mixing for an additional 5 minutes, the blend is extruded as ⅛-inch pellets, and the pellets are dried overnight at 125° C. and thereafter calcined for one hour at 401° C.

EXAMPLE 4

To a Littleford mixer there are charged 560 grams of Cu-1160 P copper chromite powder, 80 grams of Microcel E (from Johns Manville) and 220 grams of Versal-250 alumina. The mixture is dry blended for 5 minutes, and 11.4 grams of 70% nitric acid diluted with 400 grams of water are added. After mixing for an additional 30 minutes, 50 grams of water are added; mixing is continued for 16 minutes; 40 grams of water are added; and mixing is continued for 16 minutes. At this time, 2 grams of 29% ammonia solution diluted with 15 grams of water are added followed by mixing for 5 minutes. The blend is extruded as ⅛-inch pellets, dried overnight at 130° C. and thereafter calcined for one hour at 450° C.

EXAMPLE 5

To a Littleford mixer there are charged 560 grams of Cu-1160 P copper chromite powder, 160 grams of Microcel E and 110 grams of Versal-250 alumina. The mixture is dry blended for 5 minutes whereupon 5.7 grams of 70% nitric acid diluted with 450 grams of water are added. The mixture is mixed for 26 minutes and 50 grams of water are added. After mixing for 5 minutes, an additional 30 grams of water are added and this mixture is mixed for an additional 6 minutes whereupon 1 gram of 29% ammonia solution diluted with 25 grams of water are added to the mixer. After mixing an additional 7 minutes, the blend is extruded as ⅛-inch pellets, and the pellets are dried overnight at 130° C. and thereafter calcined for one hour at 427° C.

EXAMPLE 6

To a Littleford mixer there are added 558 grams of Cu-1160 P copper chromite powder and 329 grams of Versal-250 alumina. After dry blending for 5 minutes, a solution containing 17.4 grams of zirconium acetate solution (2.4 grams as zirconium oxide), 17 grams of 70% nitric acid and 392 grams of water is added with mixing. When all of the above solution has been added, the mixture is mixed for 44 minutes whereupon 3 grams of 29% ammonia solution diluted with 20 grams of water are added. This blend is mixed for 6 minutes and extruded as ⅛-inch pellets. The pellets are dried overnight at 130° C. and thereafter calcined for one hour at 398° C.

EXAMPLE 7

To a Littleford mixer there are added 735 grams of Cu-1160 P copper chromite powder and 434 grams of Versal-250 alumina. After dry blending for 5 minutes, a solution of 85 grams of 70% nitric acid and 550 grams of water is added with mixing. When all of the above solution has been added, 25 grams of 29% ammonia solution diluted with 25 grams of water are added and this mixture is mixed for an additional 30 minutes. The mixture is extruded as ⅛-inch 3-fluted pellets. The pellets are dried for about 30 minutes in flowing air at about 200° C. and thereafter calcined in a muffle furnace for one hour at 400° C. The catalysts obtained in this manner contains 65% copper chromite and 35% alumina. The surface area of the catalysts is found to be 167 m²/g, and the total pore volume of the pores in the catalysts having a diameter of up to about 95,000 Å is 0.42 cc/g.

The surface areas of the calcined extrudates prepared in Examples 1–6, as determined by the single point BET method, the total pore volumes of the catalysts and the packed apparent bulk density of the catalyst are summarized in Table I below. The packed apparent bulk density is determined by filling a graduated cylinder in small increments and tapping the cylinder gently on a soft surface after each addition until a constant volume is obtained. Generally the packed apparent bulk density of the copper chromite catalysts of the present invention will range from about 0.70 and about 1.20 g/cc. In one preferred embodiment, the range is from about 0.70 to about 0.90.

Each of the catalysts of Examples 1–6 is activated (resulting in the reduction of the copper in the catalysts) either in the reactor during the early stages of testing or externally by passing a $H_2-N_2$ mixture over the catalyst at temperatures typically less than about 200° C.

The activity of the catalyst is determined by placing 4 to 8 grams of the catalyst in a 1-liter, 316 ss autoclave equipped with an Autoclave Engineers Dispersimax Turbine. The autoclave is evacuated to 6 psia, and 447.2 grams of 2-ethyl-2-hexenal (EPA) feedstock are charged to the autoclave. After purging with nitrogen, the catalyst is heated to 150° C. with agitation, and the autoclave is pressurized with hydrogen to 1000 psig. Following pressurization, the agitator is adjusted to rotate at 1500 rpm. The temperature is maintained at about 150° C. for about 2 hours. Samples are taken at the beginning of the reaction and upon completion of the reaction.

Catalyst activity is defined in terms of the following first order rate constant.

$$\text{Catalyst activity } (K) = \ln(C^\circ_{EPA}/C_{EPA})/t$$

where $C^\circ_{EPA}$ = EPA concentration at start of reaction
$C_{EPA}$ = EPA concentration at time t
t = 2 hours.

Relative catalytic activity is determined by dividing catalyst activity (K) by the catalytic activity observed for the commercially available extruded copper chromite catalyst (Cu-1230E ⅛ in.). The percent relative activity of the catalysts of Examples 1–6 determined in this manner also are summarized in Table I.

TABLE 1

| Property/Example | 1 | 2 | 3 | 4 | 5 | 6 |
|---|---|---|---|---|---|---|
| Surface area (m²/g) | 126 | 132 | 135 | 107 | 84 | 130 |
| Total pore volume (cc/g) (<95,000 Å diameter) | 0.41 | 0.45 | 0.40 | 0.49 | 0.54 | 0.40 |
| Packed Apparent Bulk Density (g/cc) | 0.84 | 0.79 | 0.85 | 0.75 | 0.71 | 0.85 |
| Percent Relative Activity | 60.6 | 111 | 82.6 | 85.9 | 67.6 | 82.7 |

In addition to illustrating the preparation and properties of the catalyst of the present invention, the above examples also illustrate the affect of surface area, total pore volume and composition on the effectiveness of the catalyst. For example, the catalysts of Examples 2 and 3 have the same composition and substantially the same surface area (132 vs. 135), but the catalyst of Example 2 is more active as a result of the higher total pore volume (0.45 vs. 0.40). Example 4 has a 9% lower total pore volume than Example 5, but Example 4 has about a 27% higher surface area than Example 5 which more than compensates for the lower total pore volume and results in higher activity for the catalyst of Example 4. Examples 3 and 6 have similar total pore volume and surface area and similar activity. Examples 1 and 6 have similar total pore volume and surface area, but the catalyst of Example 1 has a lower copper chromite content (46% vs. 70%), and therefore, the catalyst of Example 1 has a lower activity (60.6 vs. 82.7%).

The above examples illustrate that the catalyst activity can be increased by maximizing catalytic surface area, catalytic pore volume and copper chromite content. The primary function of the binder is to provide good quality extrusions and additional porosity and surface area and through these, contribute to the catalytic activity.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A formed copper chromite catalyst prepared from a blend comprising from about 20 to about 80% by weight of copper chromite and from about 20 to about 80% by weight of at least one extrudable inorganic binder material wherein the catalyst has a surface area from about 20 to about 225 m²/g, and the total pore volume of the pores in said catalyst having a diameter of up to about 95,000 Å is between about 0.35 to about 1 cc/g.

2. The catalyst of claim 1 wherein the total pore volume of the pores in said catalyst having a diameter of up to about 95,000 Å is between about 0.4 to about 0.6 cc/g.

3. The catalyst of claim 1 wherein the surface area of the catalyst is between about 75 and 180 m²/g.

4. The catalyst of claim 1 wherein at least a portion of the copper chromite in the blend has the formula $$CuO \cdot CuCr_2O_4$$

5. The catalyst of claim 1 wherein the binder material comprises a mixture of alumina and at least one additional inorganic oxide.

6. The catalyst of claim 1 comprising from about 50 to about 80% by weight of copper chromite and from about 20 to about 50% by weight of at least one inorganic binder material.

7. The catalyst of claim 5 wherein the binder material comprises a mixture of alumina and silica.

8. The catalyst of claim 1 wherein the binder material comprises a mixture of alumina and a crystalline inorganic polymer comprising silica and alumina.

9. The catalyst of claim 8 wherein the mole ratio of silica to alumina is at least 10.

10. The catalyst of claim 8 wherein the crystalline inorganic polymer is an aluminosilicate zeolite.

11. The catalyst of claim 8 wherein the catalyst comprises from about 5% to about 30% of the crystalline inorganic polymer.

12. The catalyst of claim 1 wherein at least of portion of the copper and copper chromite are present in the reduced state.

13. The catalyst of claim 1 also including up to about 10% by weight of a stabilizer selected from the group consisting of barium and manganese.

14. A formed copper chromite catalyst prepared from a blend of from about 20 to about 80% by weight of copper chromite wherein at least a portion has the formula $$CuO \cdot CuCr_2O_4$$

and from about 20 to about 80% by weight of a mixture of at least two extrudable inorganic binder materials, said catalyst having a surface area of from about 75 and about 180 m²/g, and the total pore volume of the pores in said catalyst having a diameter of up to about 95,000 Å is between about 0.40 and about 0.70 cc/g.

15. The catalyst of claim 14 wherein the total pore volume of the pores in said catalyst having a diameter of up to about 95,000 Å is between about 0.40 and 0.60 cc/g.

16. The catalyst of claim 14 wherein the inorganic binder material comprises a mixture of alumina and an aluminosilicate zeolite.

17. The catalyst of claim 14 wherein the blend comprises from about 60 to about 80% by weight of the copper chromite and from about 20 to about 40% by weight of a mixture of binder materials comprising alumina and at least one other inorganic oxide.

18. The catalyst of claim 14 wherein at least a portion of the copper and copper chromite are present in the reduced state.

19. A method of preparing the formed copper chromite catalyst of claim 1 comprising
    (A) preparing a blend comprising from about 20 to about 80% by weight of copper chromite, from about 20 to about 80% by weight of at least one extrudable inorganic binder material, from about 1 to about 10% by weight, based on the weight of the binder, of a peptizing agent, and sufficient water to form an extrudable blend;
    (B) extruding the blend to form an extrudate; and
    (C) calcining the extrudate.

20. The method of claim 19 wherein the calcined extrudate obtained in step (c) is reduced.

21. The method of claim 20 wherein the reduced catalyst is stabilized with air or $CO_2$ or protected with an inert liquid.

22. The method of claim 19 wherein the peptizing agent is a mineral or an organic acid.

* * * * *